US010359643B2

(12) United States Patent
Wildsmith et al.

(10) Patent No.: US 10,359,643 B2
(45) Date of Patent: Jul. 23, 2019

(54) METHODS FOR INCORPORATING LENS FEATURES AND LENSES HAVING SUCH FEATURES

(71) Applicant: Johnson & Johnson Vision Care, Inc., Jacksonville, NJ (US)

(72) Inventors: Christopher Wildsmith, Jacksonville, FL (US); Peter W. Sites, Orange Park, FL (US); Mukul Kanaujia, Jacksonville, FL (US); Joe M. Wood, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 14/975,472

(22) Filed: Dec. 18, 2015

(65) Prior Publication Data
US 2017/0176771 A1 Jun. 22, 2017

(51) Int. Cl.
*G02C 7/00* (2006.01)
*G02C 7/02* (2006.01)
(Continued)

(52) U.S. Cl.
CPC ........ *G02C 7/021* (2013.01); *B29D 11/00038* (2013.01); *B29D 11/00048* (2013.01);
(Continued)

(58) Field of Classification Search
CPC .......... G02C 7/04; G02C 7/021; G02C 7/049; G02C 7/10; G02C 7/028; G02C 7/042; G02C 7/044; G02C 7/046; G02C 7/048; G02C 7/104; G02C 7/108; G02C 7/02; G02C 7/024; G02C 7/047; B29D 11/00048; B29D 11/00134; B29D 11/00144; B29D 11/00163; B29D 11/0009; B29D 11/00028; B29D 11/00038; B29D 11/0073;
(Continued)

(56) References Cited

U.S. PATENT DOCUMENTS 3,658,528 A 4/1972 Berman
3,916,033 A 10/1975 Merrill
(Continued)

FOREIGN PATENT DOCUMENTS

CN 101017208 A 8/2007
EP 0207640 A2 1/1987
(Continued)

OTHER PUBLICATIONS

PCT/US2016/066626 ; Date of Mailing Mar. 17, 2017.
(Continued)

*Primary Examiner* — Mustak Choudhury

(57) ABSTRACT

A Free-form contact lens and method of making the same. The lens includes a posterior optical quality surface having a concave shape, an opposing anterior surface having a convex shape both of which join at a lens edge that defines an outer periphery of the contact lens, and at least a first lens feature having a predetermined shape and made of a first polymerized Reactive Mixture. The remainder of the lens is made of a second polymerized Reactive Mixture that is different than the first polymerized Reactive Mixture, and that is covalently bonded thereto.

23 Claims, 5 Drawing Sheets

(51) Int. Cl.
  *G02C 7/04* (2006.01)
  *B29D 11/00* (2006.01)
  *B29K 83/00* (2006.01)
  *B29K 105/00* (2006.01)

(52) U.S. Cl.
  CPC .. *B29D 11/00134* (2013.01); *B29D 11/00144* (2013.01); *B29D 11/00153* (2013.01); *B29D 11/00961* (2013.01); *G02C 7/04* (2013.01); *B29K 2083/00* (2013.01); *B29K 2105/0032* (2013.01); *B29K 2995/0035* (2013.01); *G02C 2202/16* (2013.01)

(58) Field of Classification Search
  CPC ........ B29D 11/00192; B29D 11/00317; B29D 11/00432; B29D 11/00442; B29D 11/00653; B29D 11/101; B29D 11/0048; G02B 1/043; B29C 35/08; B29C 35/0805; B29C 35/0888; C08J 7/16; G07C 11/00
  USPC ......... 351/159.02, 159.33; 264/1.1, 1.7, 162, 264/2.7, 255, 343, 1.38, 1.36, 1.9, 2.1, 264/247, 496; 425/130, 174.4, 808; 522/172, 21, 99; 523/106
  See application file for complete search history.

(56) References Cited

U.S. PATENT DOCUMENTS

| | | | |
|---|---|---|---|
| 4,208,362 A * | 6/1980 | Deichert | B29D 11/00048 264/1.7 |
| 4,238,524 A | 12/1980 | LaLiberte et al. | |
| 4,303,701 A | 12/1981 | Togersen et al. | |
| 4,495,313 A | 1/1985 | Larsen | |
| 4,701,288 A * | 10/1987 | Cook | B29C 35/08 264/1.36 |
| 4,702,574 A | 11/1987 | Bawa | |
| 4,988,274 A | 1/1991 | Kenmochi | |
| 5,114,628 A | 5/1992 | Hofer | |
| 5,166,710 A | 11/1992 | Hofer | |
| 5,182,056 A | 1/1993 | Spence | |
| 5,200,121 A | 4/1993 | Hagmann | |
| 5,219,497 A | 6/1993 | Blum | |
| 5,396,045 A | 3/1995 | Opdyke | |
| 5,452,031 A | 9/1995 | Ducharme | |
| 5,462,700 A | 10/1995 | Beeson | |
| 5,502,518 A | 3/1996 | Lieberman | |
| 5,517,260 A | 5/1996 | Glady | |
| 5,650,837 A | 7/1997 | Roffman | |
| 5,662,706 A | 9/1997 | Legerton | |
| 5,685,420 A | 11/1997 | Martin | |
| 5,730,911 A | 3/1998 | Cano | |
| 5,782,460 A | 7/1998 | Kretzschmar et al. | |
| 5,983,201 A | 11/1999 | Fay | |
| 6,086,204 A | 7/2000 | Magnante | |
| 6,142,628 A | 11/2000 | Saigo | |
| 6,145,988 A | 11/2000 | Manfredini | |
| 6,200,646 B1 | 3/2001 | Neckers | |
| 6,217,171 B1 | 4/2001 | Auten et al. | |
| 6,233,102 B1 | 5/2001 | Hogan, Jr. | |
| 6,241,355 B1 | 6/2001 | Barsky | |
| 6,305,802 B1 | 10/2001 | Roffman | |
| 6,340,229 B1 | 1/2002 | Lieberman | |
| 6,413,251 B1 | 7/2002 | Williams | |
| 6,457,826 B1 | 10/2002 | Lett | |
| 6,471,891 B1 | 10/2002 | Cameron | |
| 6,499,843 B1 | 12/2002 | Cox | |
| 6,520,958 B1 | 2/2003 | Shimmick | |
| 6,595,639 B1 | 7/2003 | Ho | |
| 6,598,975 B2 | 7/2003 | Liang | |
| 6,616,275 B1 | 9/2003 | Dick et al. | |
| 6,626,534 B1 | 9/2003 | DiMartino | |
| 6,800,225 B1 | 10/2004 | Hagmann et al. | |
| 6,827,885 B2 | 12/2004 | Altmann et al. | |
| 6,842,223 B2 | 1/2005 | Tyminski | |
| 6,935,743 B2 | 8/2005 | Shadduck | |
| 6,966,649 B2 | 11/2005 | Shadduck | |
| 6,997,428 B1 | 2/2006 | Andino et al. | |
| 7,029,119 B2 | 4/2006 | Youssefi | |
| 7,128,866 B1 | 10/2006 | Henningsen | |
| 7,172,285 B1 | 2/2007 | Altmann | |
| 7,235,195 B2 | 6/2007 | Andino et al. | |
| 7,293,871 B2 | 11/2007 | Dreher | |
| 7,350,920 B2 | 4/2008 | Levine | |
| 7,384,146 B2 | 6/2008 | Covannon | |
| 7,431,454 B2 | 10/2008 | Hoffmann et al. | |
| 7,860,594 B2 | 12/2010 | Andino et al. | |
| 7,905,594 B2 | 3/2011 | Widman | |
| 2001/0047217 A1 | 11/2001 | Buazza et al. | |
| 2002/0024631 A1 | 2/2002 | Roffman | |
| 2002/0030788 A1 | 3/2002 | Doshi | |
| 2002/0071094 A1 | 6/2002 | Roffman | |
| 2002/0071097 A1 | 6/2002 | Ross | |
| 2002/0140902 A1 | 10/2002 | Guirao | |
| 2002/0154271 A1 | 10/2002 | Donitzky | |
| 2003/0003295 A1 | 1/2003 | Dreher | |
| 2003/0007123 A1 | 1/2003 | Broderick | |
| 2003/0030161 A1 | 2/2003 | Pegram | |
| 2003/0053031 A1 | 3/2003 | Wirth | |
| 2003/0117580 A1 | 6/2003 | Franz | |
| 2003/0128336 A1 | 7/2003 | Jethmalani | |
| 2003/0142267 A1 | 7/2003 | Gemert et al. | |
| 2004/0004287 A1 | 1/2004 | Shimizu et al. | |
| 2004/0015261 A1 | 1/2004 | Hofmann | |
| 2004/0041287 A1 | 3/2004 | Engardio | |
| 2004/0046287 A1 | 3/2004 | Andino | |
| 2004/0046931 A1 | 3/2004 | Legerton | |
| 2004/0054358 A1 | 3/2004 | Cox | |
| 2004/0064376 A1 | 4/2004 | Yoshida | |
| 2004/0100619 A1 | 5/2004 | Olivier | |
| 2004/0114101 A1 | 6/2004 | Thakrar | |
| 2004/0119174 A1 | 6/2004 | Hofmann | |
| 2004/0169820 A1 | 9/2004 | Dai | |
| 2004/0169932 A1 | 9/2004 | Esch | |
| 2004/0179167 A1 | 9/2004 | Dahi | |
| 2004/0215525 A1 | 10/2004 | Keane | |
| 2004/0222539 A1 | 11/2004 | Hagmann | |
| 2004/0233382 A1 | 11/2004 | Lindacher | |
| 2004/0246440 A1 | 12/2004 | Andino | |
| 2004/0263779 A1 | 12/2004 | Schroder | |
| 2004/0263785 A1 | 12/2004 | Chernyak | |
| 2005/0041203 A1 | 2/2005 | Lindacher | |
| 2005/0056954 A1 | 3/2005 | Devlin et al. | |
| 2005/0060196 A1 | 3/2005 | Tsushi | |
| 2005/0068489 A1 | 3/2005 | Hall | |
| 2005/0073648 A1 | 4/2005 | Toshima | |
| 2005/0074616 A1 | 4/2005 | Harchanko | |
| 2005/0089670 A1 | 4/2005 | Large | |
| 2005/0090612 A1 | 4/2005 | Soane | |
| 2005/0098478 A1 | 5/2005 | Gupta | |
| 2005/0099595 A1 | 5/2005 | Lindacher | |
| 2005/0105044 A1 | 5/2005 | Warden | |
| 2005/0105045 A1 | 5/2005 | Legerton | |
| 2005/0105048 A1 | 5/2005 | Warden | |
| 2005/0122472 A1 | 6/2005 | Fisher | |
| 2005/0131398 A1 | 6/2005 | Campbell | |
| 2005/0219461 A1 | 10/2005 | Hirohara | |
| 2005/0259221 A1 | 11/2005 | Marmo | |
| 2005/0264756 A1 | 12/2005 | Esch | |
| 2005/0275137 A1 | 12/2005 | Stolpe | |
| 2006/0001184 A1 | 1/2006 | Phelan | |
| 2006/0055071 A1 | 3/2006 | Kendig | |
| 2006/0055884 A1 | 3/2006 | Molinari | |
| 2006/0100408 A1 | 5/2006 | Powell et al. | |
| 2006/0173644 A1 | 8/2006 | Dai | |
| 2006/0192310 A1 | 8/2006 | Lindacher | |
| 2006/0192919 A1 | 8/2006 | Lindacher | |
| 2006/0232743 A1 | 10/2006 | Legerton | |
| 2006/0256451 A1 | 11/2006 | Schaack | |
| 2006/0264917 A1 | 11/2006 | Tuan | |
| 2006/0268225 A1 | 11/2006 | Lieberman | |
| 2006/0279696 A1 | 12/2006 | Perez | |

(56) References Cited

U.S. PATENT DOCUMENTS

| | | | |
|---|---|---|---|
| 2007/0023942 A1 | 2/2007 | Andino | |
| 2007/0038202 A1 | 2/2007 | Celestino | |
| 2007/0091259 A1 | 4/2007 | Svochak | |
| 2007/0097318 A1 | 5/2007 | Chehab | |
| 2007/0103639 A1 | 5/2007 | Nellissen et al. | |
| 2007/0109497 A1 | 5/2007 | Chang | |
| 2007/0132949 A1 | 6/2007 | Phelan | |
| 2007/0260349 A1 | 11/2007 | John et al. | |
| 2007/0273828 A1 | 11/2007 | Polland | |
| 2007/0274626 A1 | 11/2007 | Sabeta | |
| 2007/0284770 A1 | 12/2007 | Ansell | |
| 2007/0285760 A1 | 12/2007 | Ho | |
| 2008/0013043 A1 | 1/2008 | Ye | |
| 2008/0017977 A1 | 1/2008 | Tseng | |
| 2008/0043200 A1 | 2/2008 | Ishak | |
| 2008/0055545 A1 | 3/2008 | Clamp | |
| 2008/0062381 A1 | 3/2008 | Doshi | |
| 2008/0067702 A1 | 3/2008 | Yao | |
| 2008/0079184 A1 | 4/2008 | Yin | |
| 2008/0079895 A1 | 4/2008 | Jubin | |
| 2008/0137030 A1 | 6/2008 | Hoffman | |
| 2008/0143003 A1 | 6/2008 | Phelan | |
| 2008/0143004 A1 | 6/2008 | De Wilt | |
| 2008/0143960 A1 | 6/2008 | MacRae | |
| 2008/0143963 A1 | 6/2008 | Lindacher | |
| 2008/0165324 A1 | 7/2008 | Lindacher | |
| 2008/0179770 A1 | 7/2008 | Rooney | |
| 2008/0192201 A1 | 8/2008 | Wengler | |
| 2008/0277811 A1 | 11/2008 | Miller | |
| 2008/0288369 A1 | 11/2008 | Hunter | |
| 2008/0291395 A1 | 11/2008 | Dai | |
| 2008/0306573 A1 | 12/2008 | Campin | |
| 2008/0309873 A1 | 12/2008 | Levecq | |
| 2009/0022274 A1 | 1/2009 | Gertner | |
| 2009/0033920 A1 | 2/2009 | Simpson | |
| 2009/0051059 A1 | 2/2009 | Widman | |
| 2009/0174863 A1 | 7/2009 | Widman | |
| 2010/0047380 A1 | 2/2010 | Widman et al. | |
| 2010/0230837 A1 | 9/2010 | Zanini et al. | |
| 2012/0091368 A1 | 4/2012 | Conte | |
| 2012/0172486 A1* | 7/2012 | Zhu | C08J 7/16 523/106 |
| 2014/0079878 A1 | 3/2014 | Enns et al. | |

FOREIGN PATENT DOCUMENTS

| | | |
|---|---|---|
| EP | 322353 | 6/1989 |
| EP | 0637471 | 2/1995 |
| EP | 637491 B1 | 11/1997 |
| EP | 1657041 A1 | 5/2006 |
| EP | 1657041 B | 5/2006 |
| EP | 1750162 A2 | 2/2007 |
| EP | 1818692 A2 | 8/2007 |
| EP | 1552336 B1 | 10/2008 |
| GB | 1449685 A | 9/1976 |
| JP | 01-1983 12 | 9/1989 |
| JP | 1-198312 | 9/1989 |
| JP | 2001290978 A | 10/2001 |
| JP | 2002078681 A | 3/2002 |
| JP | 2002357796 A | 12/2002 |
| JP | 2003295134 A | 10/2003 |
| RU | 2116891 C1 | 8/1998 |
| WO | 9300816 | 1/1993 |
| WO | 1993008 016 | 4/1993 |
| WO | 1997029441 A1 | 8/1997 |
| WO | 1997033 742 A1 | 9/1997 |
| WO | 1998042497 A2 | 10/1998 |
| WO | 1998042497 A3 | 10/1998 |
| WO | 200102881 | 1/2001 |
| WO | 2001040 846 A3 | 6/2001 |
| WO | 200221 753 | 3/2002 |
| WO | 2002033628 A2 | 4/2002 |
| WO | 2003013832 | 2/2003 |
| WO | 2003037716 A2 | 5/2003 |
| WO | 2003058 287 A2 | 6/2003 |
| WO | 2003058 287 A3 | 6/2003 |
| WO | 2003077 792 | 9/2003 |
| WO | 2004015 481 | 2/2004 |
| WO | 2004022 318 A2 | 3/2004 |
| WO | 2004034 095 | 4/2004 |
| WO | 2004039554 A2 | 5/2004 |
| WO | 2004022 318 A3 | 6/2004 |
| WO | 200405 5573 A1 | 7/2004 |
| WO | 200711 2306 A1 | 10/2004 |
| WO | 2005005121 A2 | 1/2005 |
| WO | 2005005121 A3 | 1/2005 |
| WO | 2005007386 A2 | 1/2005 |
| WO | 2005007386 A3 | 1/2005 |
| WO | 2005098478 A1 | 10/2005 |
| WO | 2006010632 A1 | 2/2006 |
| WO | 2006034 864 A1 | 4/2006 |
| WO | 2006029 281 A2 | 5/2006 |
| WO | 2006029 281 A3 | 5/2006 |
| WO | 2006047 698 | 5/2006 |
| WO | WO 2008/033481 A2 | 3/2008 |
| WO | 0925848 | 2/2009 |
| WO | 1145376 | 4/2011 |
| WO | WO 2011/045376 A1 | 4/2011 |
| WO | WO 2014/005020 A1 | 1/2014 |
| WO | WO 2014005020 A | 1/2014 |

OTHER PUBLICATIONS

Cabral, J.T., et al; Propagating waves of network formation induced by light, Polymer 46 (2005) pp. 4230-4241.
PCT International Search Report, dated May 3, 2010, for PCT Int'l Appln. No. PCT/US2010/022222.
PCT International Search Report, dated Jun. 25, 2010, for PCT Int'l Appln. No. PCT/US2010/025773.
PCT International Search Report, dated Mar. 23, 2009, for PCT Int'l Appln. No. PCT/US2008/009976.
PCT International Search Report, dated Apr. 12, 2008, for PCT Int'l Appln. No. PCT/US2008/009973.
Communication from Japanese Agent dated Dec. 7, 2014 for Japanese Patent Application No. 2014-247791.
Taiwan Search Report dated Jul. 7, 2015 for TW99102498.

* cited by examiner

METHODS FOR INCORPORATING LENS FEATURES AND LENSES HAVING SUCH FEATURES

FIELD OF USE

The present invention relates generally to field of contact lenses, and more specifically to new and improved methods for incorporating into a contact lens various functional and cosmetic lens features, and lenses incorporating such features.

BACKGROUND OF THE INVENTION

The use of contact lenses to correct vision is common place in today's world. There are presently several traditional methods of high-volume, low-cost contact lens manufacture. These methods include, but are not limited to, cast molding, spin casting, lathing, using a technique known in the industry as "Lightstream Technology", and any combinations thereof.

More recently, a new system and method for manufacturing contact lenses has been disclosed in which an infinite number of truly custom lenses can readily be produced in a cost effective manner. U.S. Pat. No. 8,317,505, which is incorporated herein by reference in its entirety, discloses a method for growing a Lens Precursor Form on a single male optical mandrel on a Voxel by Voxel basis by selectively projecting actinic radiation through the optic mandrel and into a vat or bath of a Reactive Mixture. The optical mandrel and Lens Precursor Form are then removed from the vat and inverted so that the convex surface of the optic mandrel is upright. Following a dwell period during which uncured residual liquid from the bath that remains on the Lens Precursor Form flows under gravity or otherwise over the Lens Precursor Form, the liquid is then cured by applying Fixing Radiation to form the final lens. As described therein, a truly custom lens can be produced for any given eye.

Incorporating various features into contact lenses that are incidental to or not at all relevant to vision correction has also been disclosed. For example, lenses have been known to incorporate fiducial marks that assist a vision care practitioner in assessing the fit of a lens on a patient, but do not relate to the corrective power of the lens. These known fiducial markings are separately placed or encapsulated within the lens, which typically requires an additional manufacturing step. In the case of encapsulation, the item is placed between separately cured layers of the lens, which negatively affects the structural integrity of the lens layers. Other methods of placing these types of markings on a lens include milling, scribing, stamping, ink jet printing, pad printing or the like, or incorporating features into the cast mold pieces. Another method is to subsequently add or remove material from the lens such as is disclosed in U.S. Pat. No. 8,636,357. The cost and complexity or these additional manufacturing steps increases the cost of the lens. Further, known methods of separately placing markings on the surface of a lens adversely affect the optical quality surface, often negatively affecting patient comfort as well.

Accordingly, it is desirable to provide an improved system and method for incorporating fiducial marks, or other cosmetic or functional indicia such as pictures, logos, identification marks or numbers (referred to collectively herein as "lens features") into a contact lens, and lenses incorporating such lens features.

SUMMARY OF THE INVENTION

The present disclosure provides a Free-form contact lens having a posterior optical quality surface having a concave shape, an opposing anterior surface having a convex shape, where the anterior and posterior surfaces join at a lens edge that defines an outer periphery of the contact lens, and at least a first lens feature having a predetermined shape and comprised of a first polymerized Reactive Mixture. The remainder of the contact lens is made of a second polymerized Reactive Mixture that is different than the first polymerized Reactive Mixture, and the first polymerized Reactive Mixture and the second polymerized Reactive Mixture are covalently bonded.

In one embodiment, the at least first lens feature extends from the posterior optical surface to a predetermined depth within the contact lens, and the at least first lens feature is entirely surrounded by the second polymerized Reactive Mixture other than along the posterior surface. Alternatively, the at least first lens feature is entirely surrounded by the second polymerized Reactive Mixture, or the at least first lens feature extends from the anterior surface to a predetermined depth within the contact lens, and the at least first lens feature is entirely surrounded by the second polymerized Reactive Mixture other than along the anterior surface.

In various embodiments the first or second Reactive Mixture may include a fluorescing material that may optionally be fluorescein, or may include an organic dye. In further embodiments, the first or second Reactive Mixture may be Etafilcon, or a silicone based mixture.

In yet other various embodiments, the at least first lens feature may be a fiducial marker or may be a geometric pattern that could further be a picture, a logo, a numerical marking, a bar code, an alpha-numeric pattern or any combination thereof.

In yet another embodiment, the at least one lens feature is positioned outside of an optic zone of the lens.

Also provided is a method for forming a contact lens having at least one lens feature including the steps of obtaining a Lens Feature Reactive Mixture and Lens Reactive Mixture that is different from said Lens Feature Reactive Mixture, submerging at least a convex optical quality surface of a forming optic in a reservoir containing the, wherein the convex optical quality surface defines a posterior surface of the contact lens, applying Actinic Radiation through the forming optic and into the reservoir of Lens Feature Reactive Mixture, selectively controlling the applied Actinic Radiation to selectively polymerize or partially polymerize a portion of the Lens Feature Reactive Mixture on a Voxel by Voxel basis along at least a first predetermined portion of the forming optic, removing the forming optic from the reservoir of Lens Feature Reactive Mixture, submerging at least the convex optical quality surface of the forming optic and adhered Lens Feature Reactive Mixture in a reservoir of Lens Reactive Mixture, applying Actinic Radiation through the forming optic and into the reservoir of Lens Reactive Mixture, selectively controlling the applied Actinic Radiation to selectively polymerize or partially polymerize a portion of the Lens Reactive Mixture on a Voxel by Voxel basis wherein the selectively polymerized or partially polymerized Lens Reactive Mixture entirely surrounds the polymerized or partially polymerized Lens Feature Reactive Mixture other than adjacent the predetermined portion of the forming optic, removing the forming optic from the Lens Reactive Mixture, and applying Fixing Radiation to form the contact lens.

In one embodiment, the Lens Feature Reactive Mixture covalently bonds with the Lens Reactive Mixture.

In various alternative embodiments, the Lens Feature Reactive Mixture may include a fluorescing material that may be fluorescein, or may include an organic dye. In further embodiments, the Lens Reactive Mixture may be Etafilcon or may be silicone based.

In one embodiment, the selectively polymerized Lens Feature Reactive Mixture forms a predetermined shape, which may alternatively be a fiducial marker, a geometric pattern, a picture, a logo, a numerical marking, a bar code, an alpha-numeric pattern, or any combination thereof.

DETAILED DESCRIPTION OF THE INVENTION

Glossary

Figure 1:
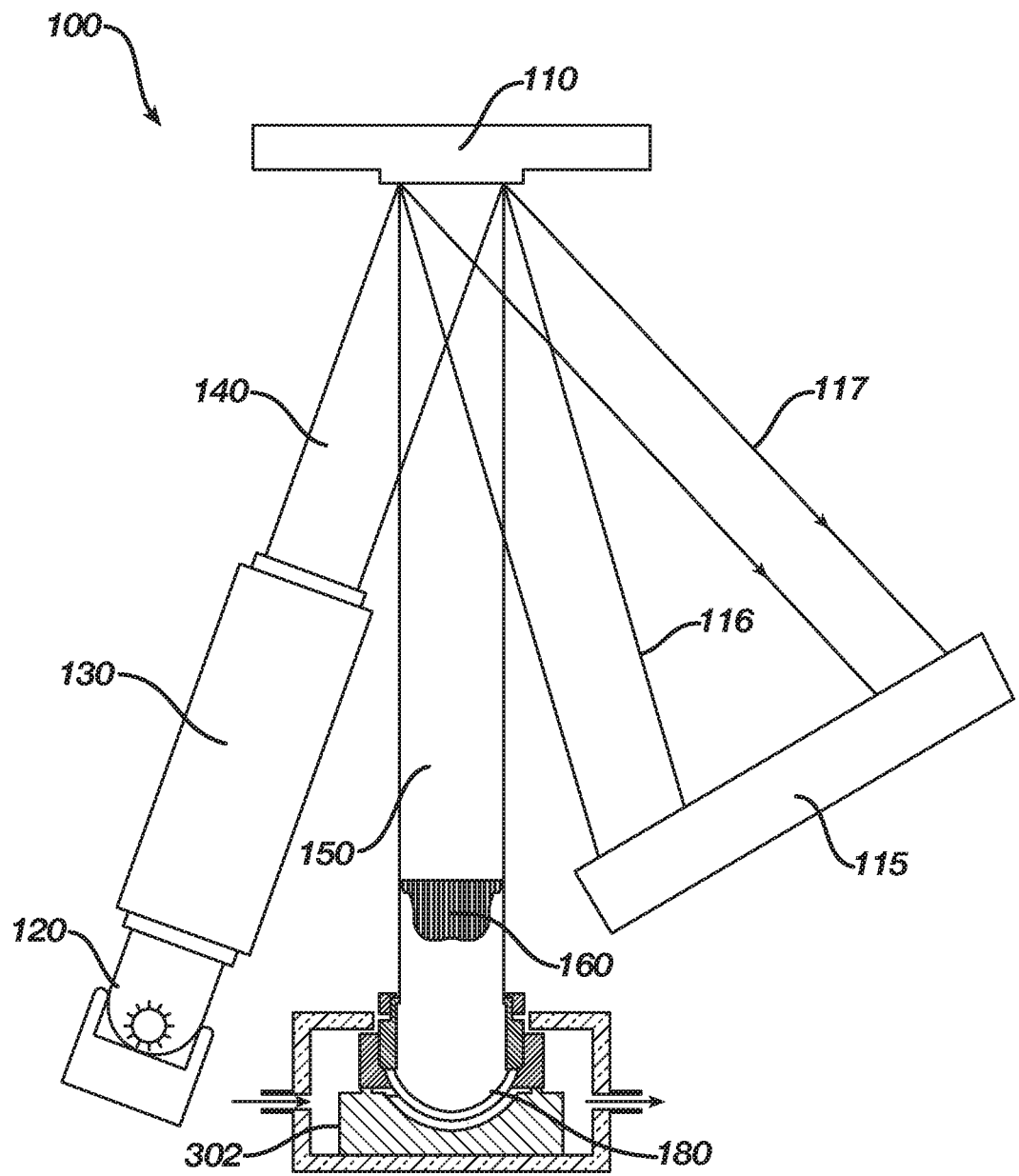
FIG. 1 illustrates a prior art apparatus useful in forming a contact lens according to the present disclosure.

In the description and claims directed to the present invention, various terms may be used for which the following definitions will apply: "Actinic Radiation" as used herein, refers to radiation that is capable of initiating a chemical reaction.

"DMD" as used herein, a digital micromirror device, is a bi-stable spatial light modulator consisting of an array of movable micromirrors functionally mounted over a CMOS SRAM substrate allowing for individual mirror on/off control. Each mirror is independently controlled by loading data into the memory cell below the mirror to steer reflected light, spatially mapping a pixel of video data to a pixel of on a display. The data electrostatically controls the mirror's tilt angle in a binary fashion, where the mirror states are either +X degrees (on) or −X degrees (off). For current devices, X can be either 10 degrees or 12 degrees (nominal). Light reflected by the on mirrors is then passed through a projection lens and onto a screen. Light is reflected off to create a dark field, and defines the black-level floor for the image. Projected images are created by gray-scale modulation between mirror on and off times at a rate fast enough to create different intensities at the formation surface and in turn create topological thickness changes. The DMD is sometimes called a DLP projection systems.

"Etafilcon" as used herein refers to an exemplary material that may be used as a Reactive Mixture and can include approximately: ~95% HEMA (2-hydroxyethyl methacrylate) and 1.97% MIVIA (methacrylic acid) and 0.78%% EGDMA (ethyleneglycol dimethacrylate) and 0.10% TMPTMA (trimethylolpropane trimethacrylate) cross-linker and ~1% photoinitiator CGI 1700 and Diluent—BAGE (boric acid ester of glycerol) (U.S. Pat. No. 4,495,313) in a 52:48 reactive component:diluent ratio.

"Fixing Radiation" as used herein, refers to Actinic Radiation sufficient to one or more of: polymerize and crosslink essentially all Reactive Mixture comprising a Lens Precursor or lens.

"Fluent Lens Reactive Media" as used herein, means a Reactive Mixture that is flowable in either its native form, reacted form, or partially reacted form and is formed upon further processing into a part of an ophthalmic lens.

"Free-form", "free-formed" or "free-form" as used herein refers to a surface that is formed by crosslinking of a Reactive Mixture and is not shaped according to a cast mold.

"Gel Point" as used herein shall refer to the point at which a gel or insoluble fraction is first observed. Gel point is the extent of conversion at which the liquid polymerization mixture becomes a solid. Gel point can be determined using a Soxhlet experiment: polymer reaction is stopped at different time points and the resulting polymer is analyzed to determine the weight fraction of residential insoluble polymer. The data can be extrapolated to the point where no gel is present. This point where no gel is present is the gel point. The gel point may also be determined by analyzing the viscosity of the reaction mixture during the reaction. The viscosity can be measured using a parallel plate rheometer, with the reaction mixture between the plates. Ate least one plate should be transparent to radiation at the wavelength used for polymerization. The point at which the viscosity approaches infinity is the gel point. Gel point occurs at the same degree of conversion for a given polymer system and specified reaction conditions.

"Lens" as used herein refers to any ophthalmic device that resides in or on the eye. These devices can provide optical correction or may be cosmetic. For example, the term lens can refer to a contact lens, intraocular lens, overlay lens, ocular insert, optical insert or other similar device through which vision is corrected or modified, or through which eye physiology is cosmetically enhanced (e.g. iris color) without impeding vision. In some embodiments, the preferred lenses of the invention are soft contact lenses are made from silicone elastomers or hydrogels, which include but are not limited to silicone hydrogels, and fluorohydrogels.

"Lens Precursor" as used herein means a composite object consisting of a Lens Precursor Form and a Fluent Lens Reactive Mixture in contact with the Lens Precursor Form. For example, in some embodiments Fluent Lens Reactive Media is formed in the course of producing a Lens Precursor Form within a volume of Reactive Mixture. Separating the Lens Precursor Form and adhered Fluent Lens Reactive Media from the volume of Reactive Mixture used to produce the Lens Precursor Form can generate a Lens Precursor. Additionally, a Lens Precursor Form can be converted to a different entity by either the removal of significant amounts of Fluent Lens Reactive Media into non-fluent incorporated material.

"Reactive Mixture" or "RMM" (reactive monomer mixture) as used herein refers to a monomer or prepolymer material which can be cured and cross-linked or cross-linked to form an ophthalmic lens. Various embodiments can include lens forming mixtures with one or more additives such as UV blockers, tints, photoinitiators, or catalysts, and other additives one might desire in an ophthalmic lens such as contact or intraocular lenses.

"Voxel" as used herein is a volume element, representing a value on a regular grid in three dimensional space. A Voxel can be viewed as a three dimensional pixel, however, wherein a pixel represents 2D image data a Voxel includes a third dimension. In addition, wherein Voxels are frequently used in the visualization and analysis of medical and scientific data, in the present invention, a Voxel is used to define the boundaries of an amount of actinic radiation reaching a particular volume of Reactive Mixture. By way of example, Voxels are considered in the present invention as existing in a single layer conformal to a 2D mold surface wherein the Actinic Radiation may be directed normal to the 2D surface and in a common axial dimension of each Voxel. As an example, specific volume of Reactive Mixture may be cross-linked or polymerized according to 768×768 Voxels.

"Voxel-based Lens Precursor" as used herein shall mean a Lens Precursor where the Lens Precursor Form has been formed by use of a Voxel-based forming technique.

As described in detail in U.S. Pat. No. 8,317,505, a truly custom lens can be formed using Voxel-based forming methods and techniques. As described therein, the apparatus takes highly uniform intensity radiation and controls irradiation onto the surface of a forming optic 180 (see FIG. 1) at numerous discrete points across the forming optic surface. The forming optic 180 is positioned within a volume of a Reactive Mixture, and controlling irradiation onto the surface of the forming optic controls the depth of curing of the resin at each discrete point, essentially "growing" the desired shape against the optical quality convex surface of the forming optic.

More particularly with reference to FIG. 1, the forming apparatus 100 functionally begins with a source of Actinic Radiation such as a light source 120, where the light generated emerges as light in a defined band of wavelengths but with some spatial variation in intensity and direction. Element 130, a spatial intensity controller or collimator, condenses, diffuses, and in some embodiments collimates light to create a beam of light 140 that is highly uniform in intensity. Further, in some embodiments, the beam 140 impinges on a DMD 110 which divides the beam into pixel elements of intensity each of which can be assigned a digital on or off value. In reality, the mirror at each pixel merely reflects light in one of two paths. The "ON" path, item 150, is the path that leads to photons proceeding toward a reactive chemical media. Conversely, in some embodiments an "OFF" state includes a light being reflected along a different path that will lie between depicted items 116 and 117. The "OFF" path directs photons to impinge upon a beam dump 115 which has been carefully crafted to absorb and entrap any photons directed towards it. Referring back to the "ON" path, light directed in this path actually includes the potentially many different pixel values that have been set to the "ON" value and are spatially directed along the appropriate individual path corresponding to their pixel location. A time averaged intensity of each of the pixel elements along their respective paths can be represented as a spatial intensity profile 160, across the spatial grid defined by the DMD mirror 110. Alternatively, with a constant intensity impinging each mirror, item 160 may represent a spatial time exposure profile.

Continuing, each pixel element in the "ON" state will have photons directed along their path 150. In some embodiments the beam may be focused by a focusing element. By way of example, in FIG. 1, the Voxel-based system 100 depicts an embodiment where the light paths 150 are imaged so that they impinge in an essentially vertical manner upon the surface of a forming optic 180. The imaged light now proceeds through the forming optic and into a volume of space that contains a Reactive Mixture in a reservoir 190, and around the forming optic 180. Photons in this volume may be absorbed and precipitate an actinic reaction in the molecule that absorbs it, leading to a polymerization state change of the monomer in the general vicinity. By selectively controlling the time and/or intensity of irradiation at each pixel, one can control the depth cure of the reactive lens mixture (302, see FIG. 3) in the reservoir 190, essentially providing complete control, on a Voxel by Voxel basis, of the shape that is produced adjacent the convex surface of the forming optic, forming a Lens Precursor Form.

It is in this general way that one particular embodiment of the Voxel based forming can be understood to function. Various additional details of various components of this embodiment, and alternatives thereto, are described in detail in the prior art, as for example in U.S. Pat. No. 8,317,505. Further, although a DMD device is described in detail therein, any suitable source of selectively controllable actinic radiation could be used.

The present invention provides a novel and useful means by which to leverage the Voxel by Voxel forming based techniques described above to provide a new and improved method for integrating lens features into a contact lens.

Figure 2:
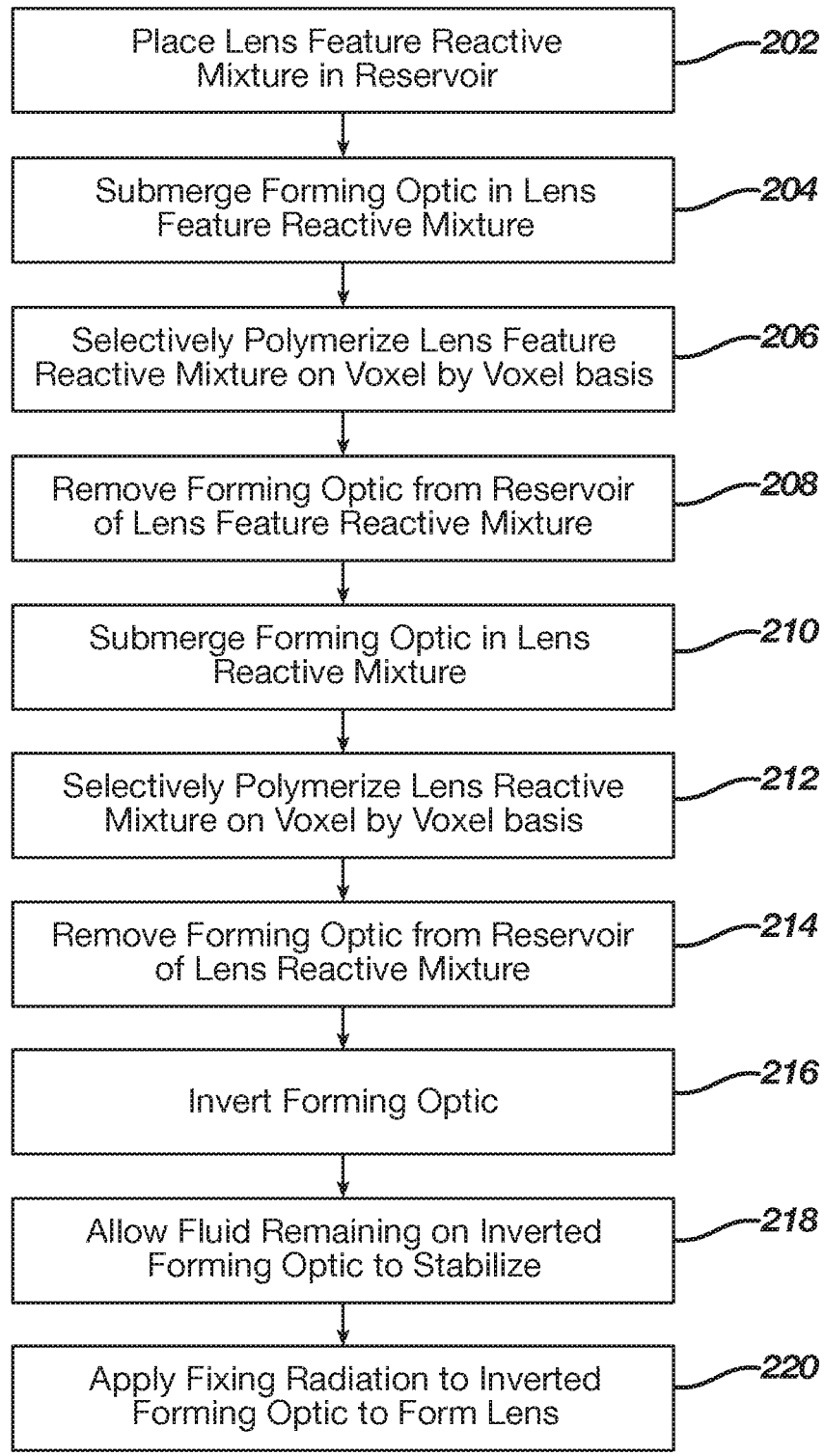
FIG. 2 is a flowchart illustrating one method for forming a contact lens according to the present disclosure.

Referring now to FIG. 2, the presently disclosed method will be described in detail below with particular reference to selectively integrating fluorescein lens features into or onto a contact lens for any one of a various number of purposes, including for creating fiducial markers or any other cosmetic patterns, lens identification markings or other purposes. Utilizing Free-form techniques and methods, in one preferred embodiment, as a first step 202 a first Reactive Mixture is obtained or created incorporating the material desired to be integrated into or onto the contact lens that will form the desired lens feature ("Lens Feature Reactive Mixture"). In one embodiment, the Lens Feature Reactive Mixture includes a fluorescing agent such as fluorescein.

Figure 3:
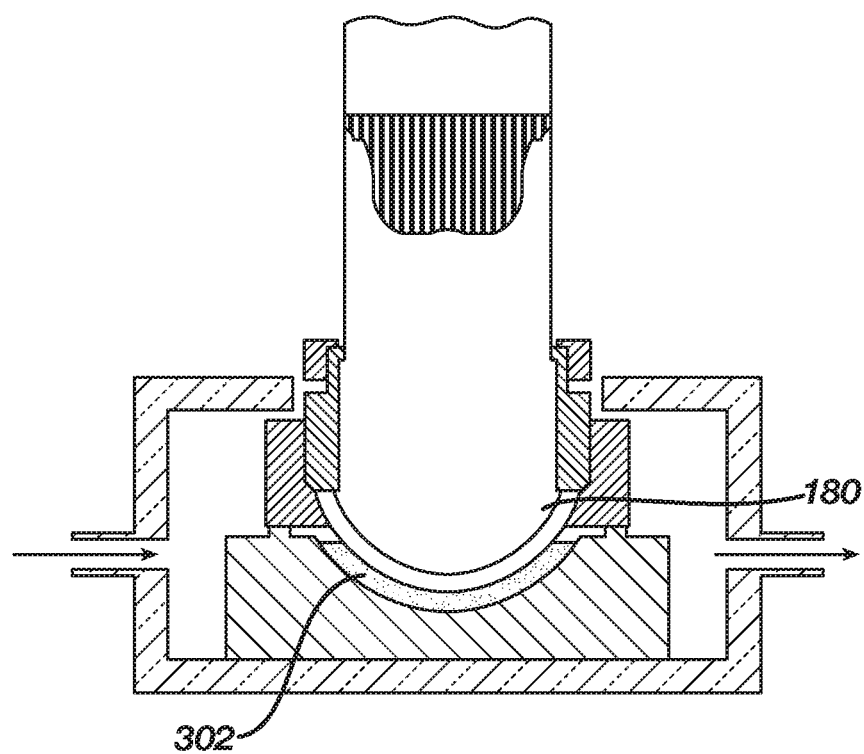
FIG. 3 is an enlarged view of the forming optic of FIG. 1.

The Lens Feature Reactive Mixture is then placed in a suitably shaped reservoir 302 (step 202), and the forming optic 180 subsequently submerged (204) in the Lens Feature Reactive Mixture 302 as illustrated in greater detail in FIG. 3. Once properly submerged, the Lens Feature Reactive Mixture can be selectively cured on a Voxel by Voxel basis in a Free-form manner to promote selective polymerization of the Lens Feature Reactive Mixture against the convex optical quality surface of the forming optic 180 to thereby create the shape and configuration of the desired lens features (step 206).

Figure 4A:
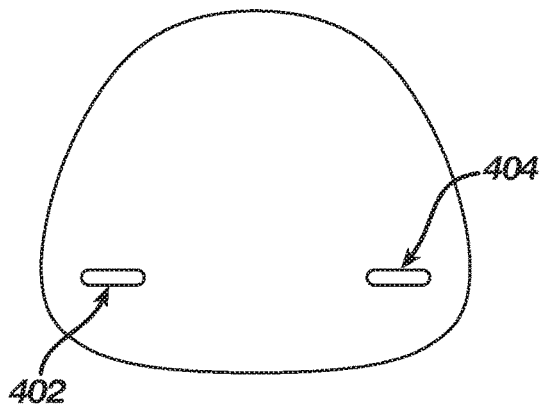
FIGS. 4a-4d illustrate contact lenses having various exemplary lens features that can be formed according to the present invention.
Figure 4B:
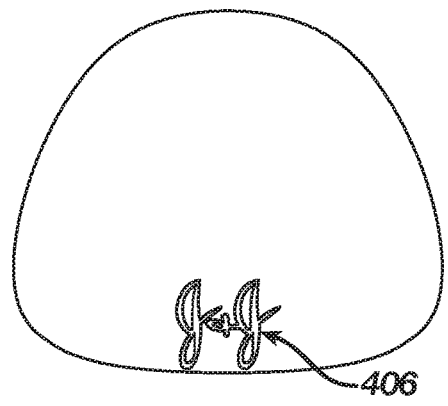
Figure 4C:
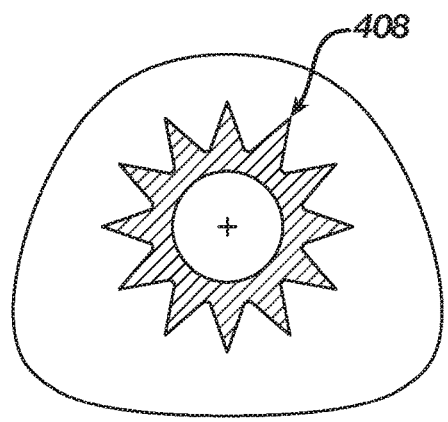
Figure 4D:
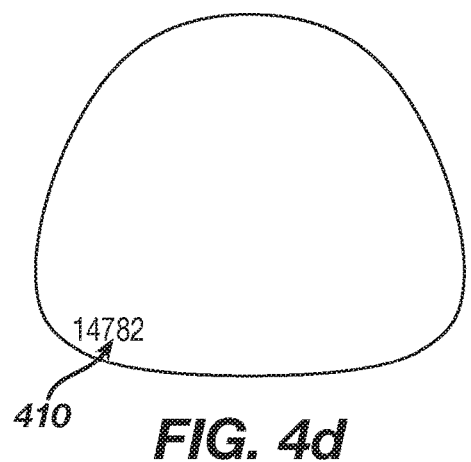

The selective polymerization as controlled on a Voxel by Voxel basis can create any desired lens feature. For example, simple fiducial marks 402, 404 can be created such as those illustrated in FIG. 4a. FIG. 4b illustrates an exemplary logo 406 that can be integrated into or onto the contact lens at any location within or external to the optic zone. Any such logo can be created, for example novelty lenses (i.e., lenses that do not necessarily have corrective vision properties) having a sport team's or college logo of any sort. Further, as shown in FIG. 4c, any cosmetic pattern 408 can also be integrated into or onto corrective or non-corrective lenses. FIG. 4d illustrates a lens having an exemplary identification marking 410. Although the illustrated marking is numerical, non-numerical markings such as bar codes, data matrices and the like are lens features that can also be integrated into a lens using the methods described herein, or any combination of such markings. Those skilled in the art will readily recognize that lens features of any shape or configuration can be created using Voxel based Free-form techniques. Further, although non-round lenses are illustrated as exemplary embodiments in the drawings, any suitable lens shape, round or otherwise, can be used.

In a preferred embodiment, selective polymerization of the Lens Feature Reactive Mixture is specifically designed to achieve the thickness of polymerization at the desired locations to any desired thickness that is sufficiently visible in the final product. Further, varying thicknesses of the polymerized Lens Feature Reactive Mixture can be selectively implemented across the lens feature or features to achieve varying visual effects.

Preferably, once fully removed the forming optic and at least partially polymerized Lens Feature Reactive Mixture are not provided additional time for stabilization. Instead, the forming optic is immediately submerged in a second reservoir (not separately illustrated but of a similar nature to the reservoir 302 shown in FIG. 3) that contains a second Reactive Mixture, which in this instance is the material from which the remaining lens will be formed ("Lens Reactive Mixture") 210. In one embodiment, the Lens Reactive Mixture is Etafilcon.

Once properly submerged, the Lens Reactive Mixture is selectively polymerized on a Voxel by Voxel basis in a Free-form manner (212) as described above for the Lens Feature Reactive Mixture. In this manner polymerized Lens Reactive Mixture is grown across the surface, including across and around the previously polymerized and partially polymerized Lens Feature Reactive Mixture. Following the second selective polymerization step (212), the forming optic is removed from the reservoir (214), inverted (216), and allowed to stabilize (218) for preferably four minutes. Following stabilization, any remaining fluent Lens Reactive Mixture is exposed to Fixing Radiation (220) to form the final finished contact lens.

Figure 5A:
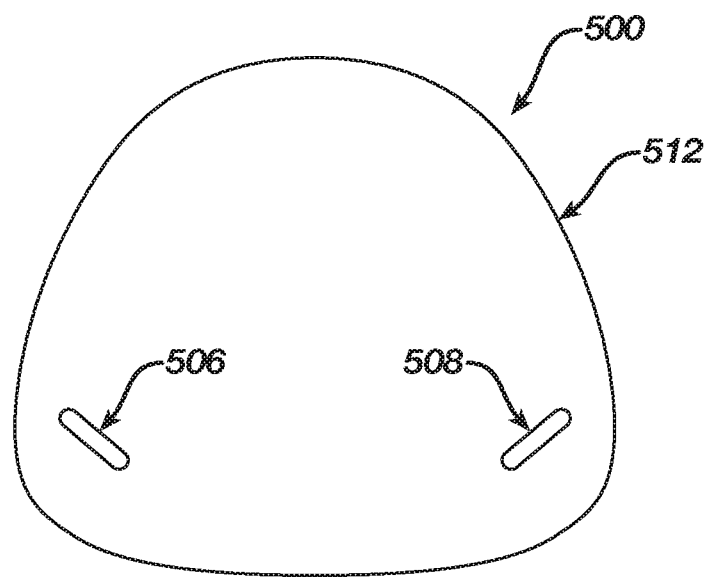
FIGS. 5a and 5b are top and cross-sectional side views respectively of a contact lens having exemplary lens features according to the present disclosure.
Figure 5B:
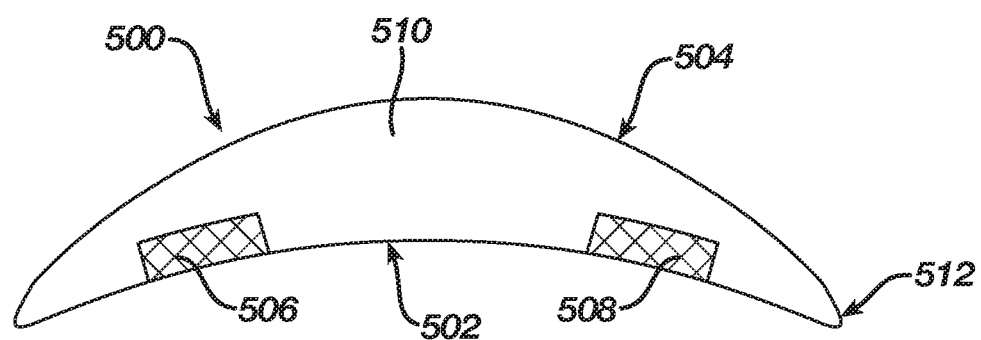

FIGS. 5*a* and 5*b* are top and cross-sectional side views of an exemplary lens formed according to the above-described method. The lens 500 includes an optical quality concave posterior surface 502 which is the surface that is in contact with the patient's eye when worn and the surface that is in contact with the convex optical quality surface of the forming optic during manufacture, and an opposing anterior convex surface 504. The anterior and posterior surfaces join together along a lens edge 512 that defines the outer periphery of the lens. The illustrated embodiment includes lens features that are first and second indicia or markers 506, 508, in this instance comprised from a fluorescein mixture (or any other compatible ink, pigment or dye) as described above and intended for the purpose of assessing orientation of the lens on the eye. As illustrated in FIG. 5*b* and described above, the first and second indicia 506, 508 are formed in the first selective polymerization step from the Lens Feature Reactive Mixture, and extend from the posterior surface 502 inward into the lens to a predetermined depth, which is controlled during the selective polymerization step as described. The remainder of the lens 510 is formed of polymerized Lens Reactive Mixture. When selectively polymerized as described herein, the Lens Reactive Mixture and Lens Feature Reactive Mixture form an interpenetrating network that is covalently bonded to form a continuous lens structure. This forming technique prevents delamination or leaching of the marking agent during hydration and otherwise.

The process and resulting product described herein has lens features integrated therein, in a product having optical quality surfaces on both sides. Many previously known methods of applying indicia or a marking to a lens surface adversely affects the integrity (and thus fit and comfort) of the optical quality surface. For example, scribing or the like, or applying such markings via a separate process such as ink jet printing, results in a suboptimal quality surface, with divots, raised surfaces or the like.

Other known methods that embed markings within the lens do so between lens layers which adversely affects the integrity of the lens as the layers are more prone to separation. To the contrary, in lenses formed via the methods described herein the lens features are highly integrated and covalently bonded with the remaining lens material, as following the initial selective polymerization step the Lens Feature Reactive Mixture is not fully cured, but rather is loosely bound, and as such interacts with the Lens Reactive mixture during the second selective polymerization step to be chemically linked via covalent bonding. Further, selective polymerization according to the present method does not require masking, or any other similar technique and accompanying complexity, to accomplish.

Although the embodiment described above places a lens feature on the posterior, concave optical surface of the lens, the method described herein can readily be adapted to place a lens feature embedded entirely within the lens, or on the anterior, convex surface of the lens. For example, in the latter instance the process is simply reversed with selective polymerization of the Lens Reactive Mixture occurring first and selective polymerization of the Lens Feature Reactive Mixture occurring second. Similarly, a third step can be introduced to embed the lens feature entirely within the lens, where selective polymerization of the Lens Reactive Mixture occurs in a first step, followed by selective polymerization in a volume of Lens Feature Reactive Mixture, followed by a third step of selective polymerization again in a volume of Lens Reactive Mixture.

Although particular materials have been described in detail herein, those skilled in the art will readily understand that any suitable Lens Reactive Mixture and/or Lens Feature Reactive Mixture may be used in accordance with the present invention. For example, a silicone derivative may be used for the Lens Reactive Mixture, and any suitable organic dye or the like may be used for the Lens Feature Reactive Mixture. Similarly, although illustrative embodiments of methods of manufacturing the described lenses and exemplary devices to implement those methods have been described herein with reference to the accompanying drawings, it is to be understood that the invention is not limited to those precise embodiments and that various other changes and modifications may be effected herein by one skilled in the art without departing from the scope or spirit of the invention, which is limited only by the claims herein.

The invention claimed is:

1. A Free-form contact lens comprising:
   a posterior optical quality surface having a concave shape;
   an opposing anterior surface having a convex shape, said anterior and posterior surface joining at a lens edge that defines an outer periphery of said Free-form contact lens; and
   at least a first lens feature having a predetermined shape and comprised of a first Reactive Mixture selectively polymerized on a voxel by voxel basis through a male mold,
   wherein the remainder of said contact lens is comprised of a second Reactive Mixture selectively polymerized on a voxel by voxel basis through said male mold, wherein the second Reactive Mixture is different than the first polymerized Reactive Mixture, and is covalently bonded with the first polymerized Reactive Mixture, wherein the at least first lens feature extends to a predetermined depth within the Free-form contact lens from either the anterior or posterior surface, and wherein said predetermined depth is less than a thickness of said Free-form contact lens at that location, and wherein the first lens feature is entirely surrounded by said second polymerized Reactive Mixture on all sides other than along said anterior or posterior surface.

2. The contact lens according to claim 1, wherein the first or second Reactive Mixture includes a fluorescing material.

3. The contact lens according to claim 2, wherein the fluorescing material contains a fluorescein component.

4. The contact lens according to claim 1, wherein the first or second Reactive Mixture includes an organic dye.

5. The contact lens according to claim 1, wherein the first or second Reactive Mixture is Etafilcon.

6. The contact lens according to claim 1, wherein the first or second Reactive Mixture is silicone based.

7. The contact lens according to claim 1, wherein the at least first lens feature is a fiducial marker.

8. The contact lens according to claim 1, wherein the at least first lens feature is a geometric pattern.

9. The contact lens according to claim 8, wherein the geometric pattern is a picture.

10. The contact lens according to claim 8, wherein the geometric pattern is a logo.

11. The contact lens according to claim 8, wherein the geometric pattern is a numerical marking.

12. The contact lens according to claim 8, wherein the geometric pattern is a bar code.

13. The contact lens according to claim 8, wherein the geometric pattern is an alpha-numeric pattern.

14. The contact lens according to claim 1, wherein the at least one lens feature is positioned outside of an optic zone of said lens.

15. A Free-form contact lens comprising:
a posterior optical quality surface having a concave shape;
an opposing anterior surface having a convex shape, said anterior and posterior surface joining at a lens edge that defines an outer periphery of said Free-form contact lens; and
at least a first lens feature having a predetermined shape and comprised of a first Reactive Mixture polymerized on a voxel by voxel basis through a male mold, wherein the remainder of said Free-form contact lens is comprised of a second Reactive Mixture polymerized on a voxel by voxel basis through said male mold, wherein the second Reactive Mixture is different than the first polymerized Reactive Mixture, and is covalently bonded to the first polymerized Reactive Mixture, and wherein the at least first lens feature does not touch the anterior or posterior surface of the Free-form contact lens and is entirely surrounded on all sides by said second polymerized Reactive Mixture.

16. The contact lens according to claim 15, wherein the first or second Reactive Mixture includes a fluorescing material.

17. The contact lens according to claim 15, wherein the first or second Reactive Mixture includes an organic dye.

18. The contact lens according to claim 15, wherein the first or second Reactive Mixture is Etafilcon.

19. The contact lens according to claim 15, wherein the first or second Reactive Mixture is silicone based.

20. The contact lens according to claim 15, wherein the at least first lens feature is a fiducial marker.

21. The contact lens according to claim 15, wherein the at least first lens feature is a geometric pattern including a letter or numerical marker.

22. The contact lens according to claim 15, wherein the at least first lens feature is a bar code.

23. The contact lens according to claim 15, wherein the at least one lens feature is positioned outside of an optic zone of said lens.

* * * * *